United States Patent
Okuya et al.

(10) Patent No.: US 9,952,597 B2
(45) Date of Patent: Apr. 24, 2018

(54) APPARATUS FOR CORRECTING VEHICLE LOCATION

(71) Applicant: DENSO CORPORATION, Kariya, Aichi-pref. (JP)

(72) Inventors: Tsubasa Okuya, Kariya (JP); Minoru Okada, Kariya (JP); Hiroshi Inou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/265,242

(22) Filed: Sep. 14, 2016

(65) Prior Publication Data
US 2017/0097642 A1    Apr. 6, 2017

(30) Foreign Application Priority Data
Sep. 16, 2015  (JP) .................................. 2015-182767

(51) Int. Cl.
G08G 1/08    (2006.01)
G05D 1/02    (2006.01)
G01C 21/00   (2006.01)

(52) U.S. Cl.
CPC ........... *G05D 1/0212* (2013.01); *G01C 21/00* (2013.01); *G05D 1/0278* (2013.01)

(58) Field of Classification Search
CPC .... G05D 1/0212; B62D 15/025; G01C 21/26; G08G 1/08
See application file for complete search history.

(56) References Cited

U.S. PATENT DOCUMENTS

| 6,230,097 | B1* | 5/2001 | Dance ............... G01C 21/26 340/988 |
| 6,549,846 | B1* | 4/2003 | Dance ............... G01C 21/26 701/518 |
| 9,349,288 | B2* | 5/2016 | Raamot ................. G08G 1/08 |
| 2009/0043495 | A1 | 2/2009 | Hattori et al. |
| 2010/0191421 | A1* | 7/2010 | Nilsson ............... B62D 15/025 701/41 |
| 2016/0027299 | A1* | 1/2016 | Raamot ................. G08G 1/08 340/917 |

* cited by examiner

*Primary Examiner* — Yuri Kan
(74) *Attorney, Agent, or Firm* — Knobbe, Martens, Olson & Bear, LLP

(57) ABSTRACT

In an apparatus for correcting a location of a vehicle, a satellite positioning unit mounted in the vehicle measures the location of the vehicle using navigation satellites. A locational trajectory generating unit generates a locational trajectory of the vehicle based on the location of the vehicle measured by the satellite positioning unit. A location correcting unit corrects the location of the vehicle based on the locational trajectory and map information stored in a map information storage. The location correcting unit, for each of the vehicle locations included in the locational trajectory, determines in which one of the lanes of the road the vehicle was traveling as the vehicle location was measured, and geometrically compares at least one traveled lane of the road acquired from the determination and the locational trajectory, and based on the comparison, calculates a locational correction amount of the location of the vehicle.

17 Claims, 13 Drawing Sheets

MAP INFORMATION: ROAD SHAPE (WIDTH, NUMBER OF LANES, etc.)

GENERATION OF LANE INFORMATION

ACQUISITION OF TRAVEL INFORMATION FROM OTHER VEHICLES

ACQUIRED TRAVEL INFORMATION    GENERATION OF LANE INFORMATION

APPARATUS FOR CORRECTING VEHICLE LOCATION

CROSS-REFERENCE TO RELATED APPLICATION

This application is based on and claims the benefit of priority from earlier Japanese Patent Applications No. 2015-182767 filed Sep. 16, 2015, the description of which is incorporated herein by reference.

BACKGROUND

Technical Field

The present invention relates to a vehicle location correction apparatus for determining a road on which a vehicle carrying the apparatus is traveling based on a detected location of the vehicle, and correcting the detected location of the vehicle to a proper location on the road.

Related Art

A known apparatus for correcting a location of a vehicle carrying the apparatus, as disclosed in Japanese Patent Application Laid-Open Publication No. 2009-41988, is configured to generate trajectory data using coordinates of the location measured by a Global Positioning System (GPS) receiver for a past predetermined period of time, compare the trajectory data and map data, and based on the comparison, estimate a road correlating to a movement trajectory of the GPS receiver as a road on which a vehicle carrying the apparatus is traveling. Such a road will be referred to as a traveled road.

The above known vehicle location correction apparatus is configured to estimate bias errors in location coordinates measured by the GPS receiver by comparing location coordinates of the trajectory data and the estimated traveled road, and using the estimated bias errors, correct the location coordinates of the vehicle measured by the GPS receiver (i.e., the location of the vehicle).

The above known vehicle location correction apparatus estimates a road that geometrically matches the movement trajectory of the GPS receiver to calculate the bias errors. With this configuration, the above vehicle location correction apparatus can correct the location of the vehicle onto the traveled road. However, in the case of the traveled road having multiple lanes, the apparatus is unable to determine which lane of the traveled road the vehicle is traveling in.

Thus, the above known vehicle location correction apparatus may not be able to provide adequate accuracy of a location of the vehicle carrying the apparatus, For instance, when the vehicle is automatically driven along a target trajectory generated by the apparatus, the vehicle can not always be driven in an optimal one of the multiple lanes.

In consideration of the foregoing, exemplary embodiments of the present invention are directed to providing techniques for determining which lane of a road having multiple lanes a vehicle is traveling in and thereby more accurately correcting a location of the vehicle.

SUMMARY

In accordance with an exemplary embodiment of the present invention, there is provided an apparatus for correcting a location of a vehicle, including a satellite positioning unit mounted in the vehicle and configured to measure the location of the vehicle using navigation satellites, a map information storage storing map information from which lanes of a road can be recognized, and a locational trajectory generating unit configured to generate a locational trajectory of the vehicle based on the location of the vehicle measured by the satellite positioning unit.

The apparatus further includes a location correcting unit configured to correct the location of the vehicle based on the locational trajectory generated in the locational trajectory generating unit and the map information stored in the map information storage.

The location correcting unit is configured to, for each of the vehicle locations included in the locational trajectory, determine in which one of the lanes of the road the vehicle was traveling as the vehicle location was measured, and geometrically compare at least one traveled lane of the road acquired from the determination and the locational trajectory, and based on the comparison, calculate a locational correction amount of the location of the vehicle.

This configuration of the apparatus makes it possible to determine which of the lanes of the road the vehicle is traveling in, and correct the location of the vehicle onto the determined lane, which can provide improved accuracy of correcting the vehicle location as compared with the above known apparatus.

BRIEF DESCRIPTION OF THE DRAWINGS

FIG. 8 is an explanatory diagram for describing determination of which lane vehicle locations belong to;

DESCRIPTION OF SPECIFIC EMBODIMENTS

Embodiments of the present invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

First Embodiment

A vehicle location correction apparatus 2 in accordance with a first embodiment of the present invention is mounted in a vehicle and configured to detect a location of the vehicle and correct for detection errors, and output the corrected location of the vehicle to various driving assistance devices, such as a navigation unit and the like. The vehicle carrying the apparatus is hereinafter referred to as an own vehicle.

Figure 1:
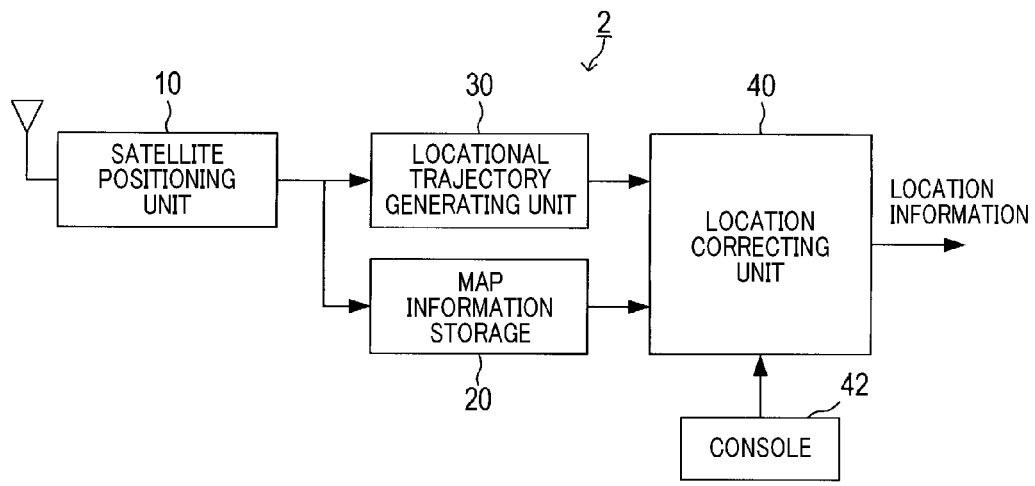
FIG. 1 is a block diagram of the overall configuration of a vehicle location correction apparatus in accordance with a first embodiment of the present invention.

As shown in FIG. 1, the vehicle location correction apparatus 2 includes a satellite positioning unit 10, a map information storage 20, a locational trajectory generating unit 30, and a location correcting unit 40.

The satellite positioning unit 10 is configured to receive radio waves transmitted from a plurality of satellites to acquire location information (including latitude, longitude, and altitude) indicative of a location of the own vehicle via so called satellite positioning. The satellite positioning unit 10 may be configured in a GPS receiver.

The map information storage 20 includes a storage media, such as a semiconductor memory, a hard disk, an optical disc or the like, storing map information usable to recognize traffic lanes. The map information storage 20 is configured to extract from the storage media the map information about surroundings of the location of the own vehicle detected at the satellite positioning unit 10 and output the extracted map information to the location correcting unit 40.

The map information stored in the storage media of the map information storage 20 includes at least one of lane information indicative of locations (each specified by e.g., latitude, longitude, and altitude) of nodes in the lateral center of each lane of each road, boundary information indicative of locations of boundaries (e.g., white lines) of each lane of each road, and road information indicative of a location and a shape (e.g., a curvature, a gradient, the number of lanes, a width and the like) of each road. This makes it possible to recognize the lane the own vehicle is traveling in.

Figure 2:
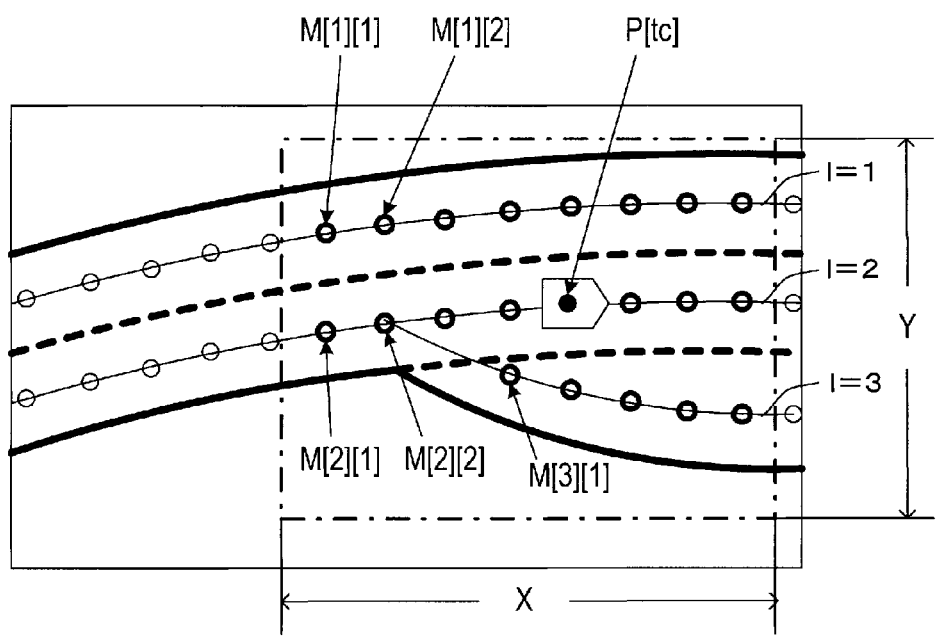
FIG. 2 is an explanatory diagram for describing a map information configuration and map information acquisition.

In the present embodiment, as shown in FIG. 2, the map information is stored in the storage media of the map information storage 20, where the map information includes locations (each specified by latitude and longitude, and altitude) of respective nodes indicated by small circles in the lateral center of each lane of each road and a shape (specified by a curvature and a gradient) of a link connecting the nodes of the lane.

The map information storage 20 is configured to, based on current location information of the own vehicle P[tc] received from the satellite positioning unit 10, extract the map information about roads within a predetermined area [X*Y] around the own vehicle and output the extracted map information to the location correcting unit 40.

The locational trajectory generating unit 30 is configured to sample the location of the own vehicle via the satellite positioning unit 10 every predetermined time interval to generate a locational trajectory as the own vehicle travels a predetermined distance. The location correcting unit 40 is configured to geometrically match the locational trajectory generated in the locational trajectory generating unit 30 with the map information acquired from the map information storage 20 about the surroundings of the own vehicle to correct the (sampled) locations of the own vehicle included in the locational trajectory so that the locational trajectory is consistent with the map information.

The location correcting unit 40 is provided with a console 42 for entering various operating conditions, such as a length (i.e., a distance) of limited trajectory point sequence (described later). The locational trajectory generating unit 30 and the location correcting unit 40 may be configured as a microcomputer including a central processing unit (CPU), a read-only memory (ROM), a random-access memory (RAM), and other components, or as dedicated electronic circuitry, to perform locational trajectory generation processing and locational correction processing according to the procedure as shown in FIG. 3.

Figure 3:
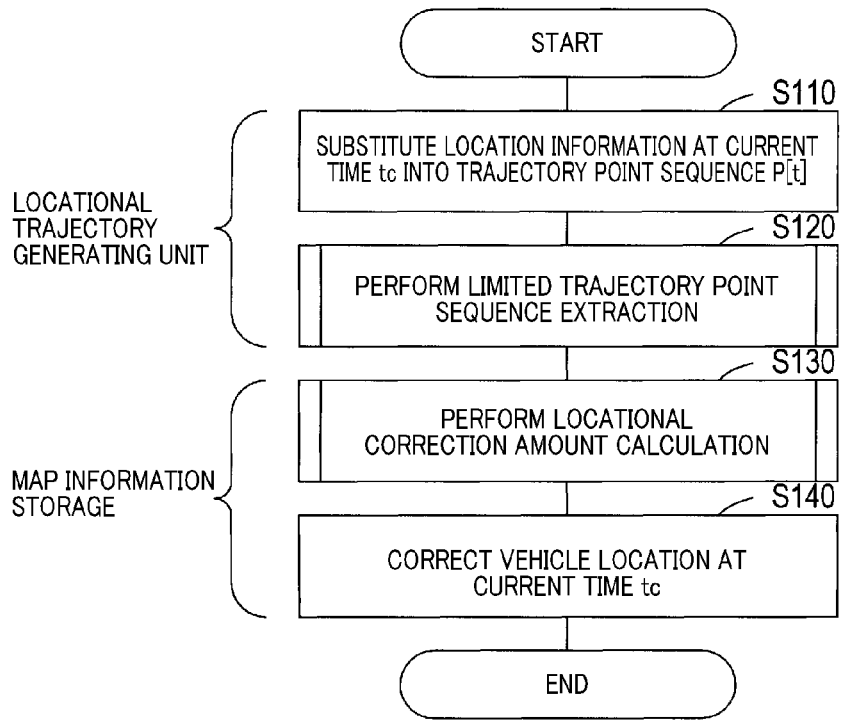
FIG. 3 is a flowchart of processing to be performed in a locational trajectory generating unit and a location correcting unit.

The processing shown in FIG. 3 may be implemented by the microcomputer executing computer programs stored in the ROM or the like, or may be implemented by dedicated electronic circuitry.

As shown in FIG. 3, in step S110, the locational trajectory generating unit 30 substitutes location information acquired from the satellite positioning unit 10 at the current time tc into a trajectory point sequence P[t] that is a sequence of sampled locations of the own vehicle along the locational trajectory. This allows the location information representing the trajectory point sequence P[t] from the initial location P[1] to the current location P[tc] to be stored in the memory (e.g., the RAM, ROM, flash ROM or the like).

Figure 4:
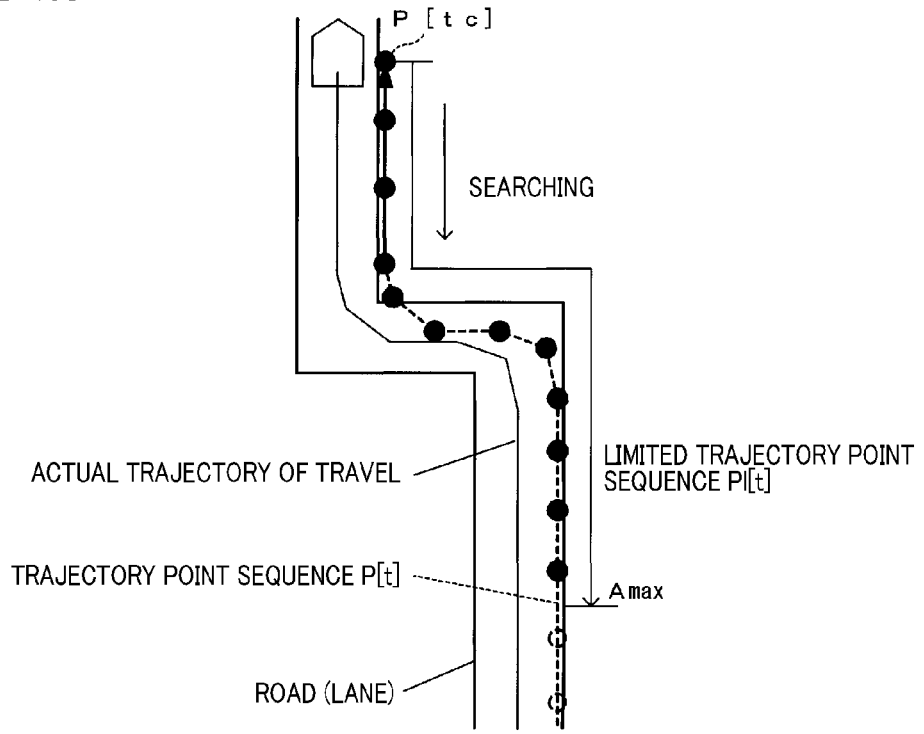
FIG. 4 is an explanatory diagram for describing a limited trajectory point sequence.

Subsequently, in step S120, the locational trajectory generating unit 30 extracts from the trajectory point sequence P[t] stored in the memory a limited trajectory point sequence Pl[t] for use in the locational correction. The limited trajectory point sequence Pl[t], as shown in FIG. 4, is a trajectory point sequence with a limited path length reaching back from the current location information P[tc] being equal to or less than a maximum path length Amax.

The maximum path length Amax may be set to an arbitrary value via the console 42. In some alternative embodiments, the limited trajectory point sequence Pl[t] may be extracted from the area inside a circle with predetermined radius centered at the current location information P[tc].

Figure 5:
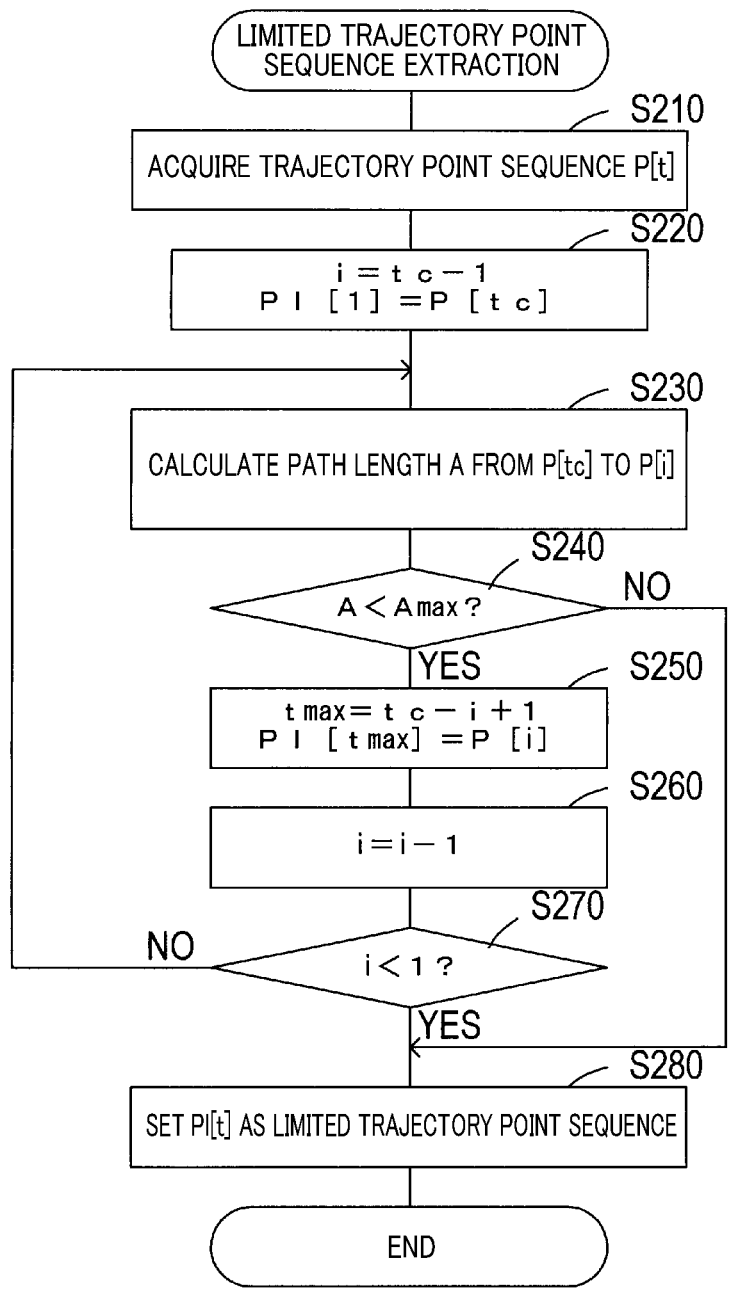
FIG. 5 is a flowchart of limited trajectory point sequence extraction processing.

The limited trajectory point sequence extraction processing in step S120 is performed in the locational trajectory generating unit 30 in a procedure shown in FIG. 5. In step S210, the trajectory point sequence P[t] including the location information until the current time tc is read from the memory. In step S220, a counter i is set to an initial value of tc−1, and an initial search position Pl[1] of the limited trajectory point sequence Pl[t] is set to the current location information P[tc].

In step S230, a path length A of a trajectory from the current location of the own vehicle specified by the location information P[tc] to a location of the own vehicle specified by P[i] is calculated. In step S240, it is determined whether or not the path length A calculated in step S230 is less than the maximum path length Amax. If it is determined that the path length A calculated in step S230 is less than the maximum path length Amax, then the process flow proceeds to step S250.

In step S250, a value of tmax representing the current search position of the limited trajectory point sequence Pl[t] is set to tc−i+1, and the vehicle location Pl[tmax] is set to P[i]. In step S260, the counter i is decremented by one to update the counter i. In step S270, it is determined whether or not the counter i is less than one, that is, whether or not searching over the trajectory point sequence P[t] acquired in step S210 has been completed.

If in step S270 it is determined that searching over the trajectory point sequence P[t] has not been yet completed, that is, i≥1, then the process flow proceeds to step S230. If it is determined that searching over the trajectory point sequence P[t] has been completed, that is, i<1, the process flow proceeds to step S280. In addition, if in step 240 it is determined that the path length A is equal to or greater than the maximum path length Amax, then the process flow proceeds to step S280.

In step S280, the vehicle locations from the initial search position Pl[1] to the latest search position Pl[tmax] forming the limited trajectory point sequence Pl[t] are stored in the memory. Returning to FIG. 3, after the locational trajectory generating unit 30 has performed the limited trajectory point sequence extraction processing in step S120, the location correcting unit 40 performs locational correction amount calculation processing in step S130.

Figure 6:
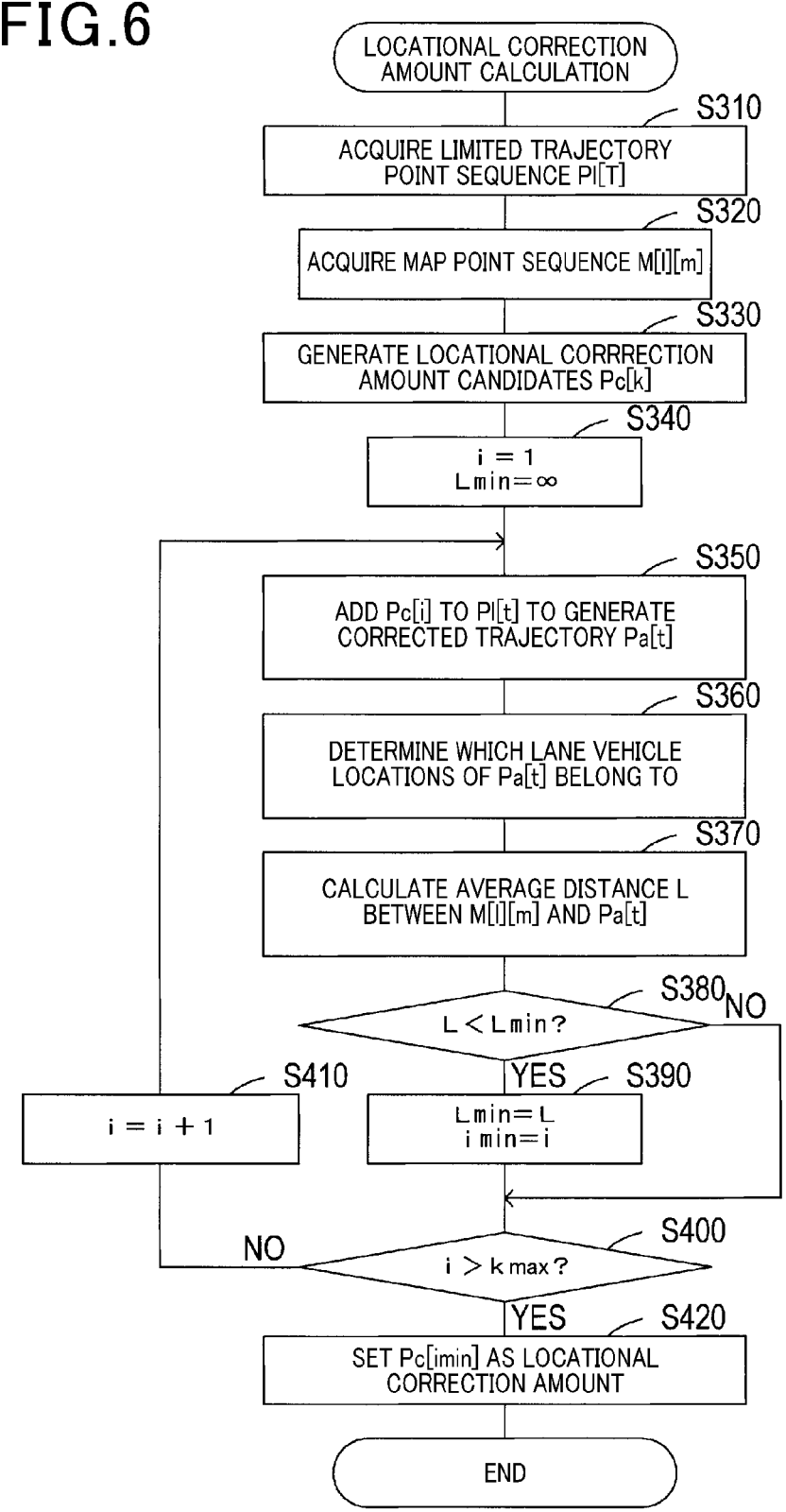
FIG. 6 is a flowchart of locational correction amount calculation processing.

The locational correction amount calculation processing in step S130 is performed in the location correcting unit 40 in a procedure shown in FIG. 6. In step S310, the location correcting unit 40 acquires the limited trajectory point sequence Pl[t] from the locational trajectory generating unit 30, and then in step S320, acquires the map information about the surroundings of the own vehicle from the map information storage 20.

In step S320, as shown in FIG. 2, the location correcting unit 40 acquires node information for each lane of the traveled road representing a map point sequence M[l][m] from the map information stored in the map information storage 20. Regarding the notation of the map point sequence M[l][m], [l] represents a lane number, and [m] represents a node number.

Figure 7:
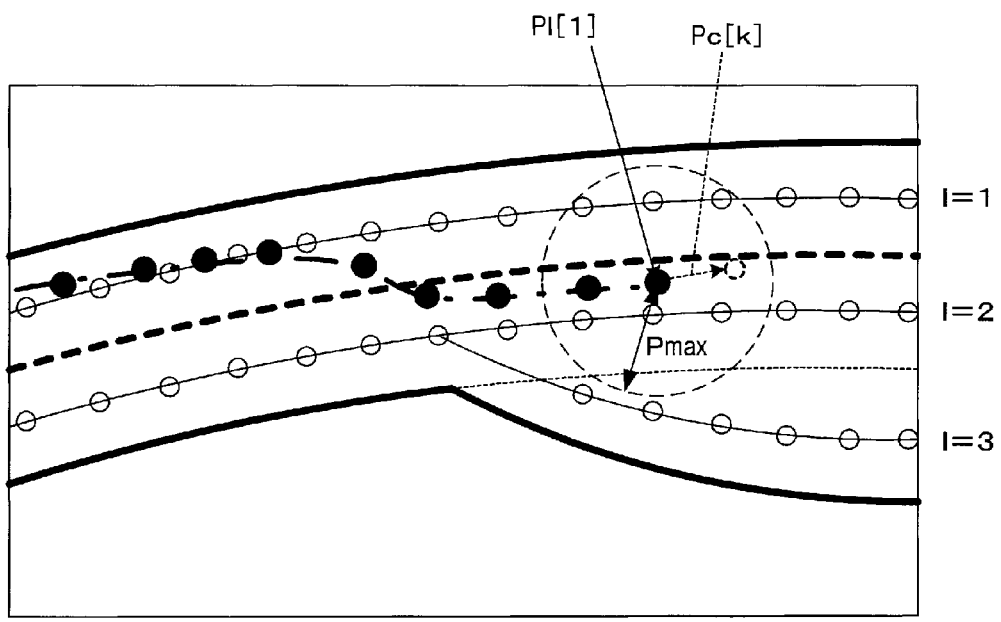
FIG. 7 is an explanatory diagram for describing generation of locational correction amount candidates.

In step S330, as shown in FIG. 7, the location correcting unit 40 randomly generates a plurality of locational correction amount candidates Pc[k] in the vicinity of an initial location Pl[1] (i.e., the current location of the own vehicle) of the limited trajectory point sequence Pl[t] acquired in step S310. As an example, the plurality of locational correction amount candidates Pc[k] may be generated inside a circle of radius Pmax centered at the initial location Pl[1].

Regarding the notation of Pc[k], k represents an integer between one and kmax (indicative of the number of locational correction amount candidates). In the present embodiment, the map information is representing by three-dimensional coordinates (latitude, longitude, altitude). Therefore, the limited trajectory point sequence Pl[t] is translated by each locational correction amount candidate Pc[k] (1≤k≤kmax) in the three-dimensional coordinate system.

In step S340, the location correcting unit 40 initially sets a counter i to a value of one and initially sets a minimum value of an average distance L (described later), Lmin, to infinity. In step S350, the location correcting unit 40 adds the locational correction amount candidate Pc[i] specified by the counter i to the location information of all the vehicle locations included in the limited trajectory point sequence Pl[t] acquired in step S310 to generate a corrected trajectory Pa[t]. The corrected trajectory Pa[t] is a locational trajectory obtained by translating the limited trajectory point sequence Pl[t] by the locational correction candidate Pc[i] in three-dimensions.

Subsequently to generation of the corrected trajectory Pa[t], the location correcting unit 40, in step S360, determines which lane the vehicle locations included in the corrected trajectory Pa[t] belong to. More specifically, as shown in FIG. 8, for each of the vehicle locations included in the corrected trajectory Pa[t], the location correcting unit 40 drops perpendiculars A1, A2 from the vehicle location onto lanes I1, I2 around the own vehicle specified by the map point sequences M[l][m] acquired in step S320.

The lane associated with the shortest perpendicular A1 or A2 is determined to be the lane that the vehicle location belongs to. In FIG. 8, the perpendicular A1 is longer than the perpendicular A2. Therefore, the lane I2 associated with the perpendicular A2 shorter than the perpendicular A1 is determined to be the lane that the vehicle location belongs to.

Figure 8:
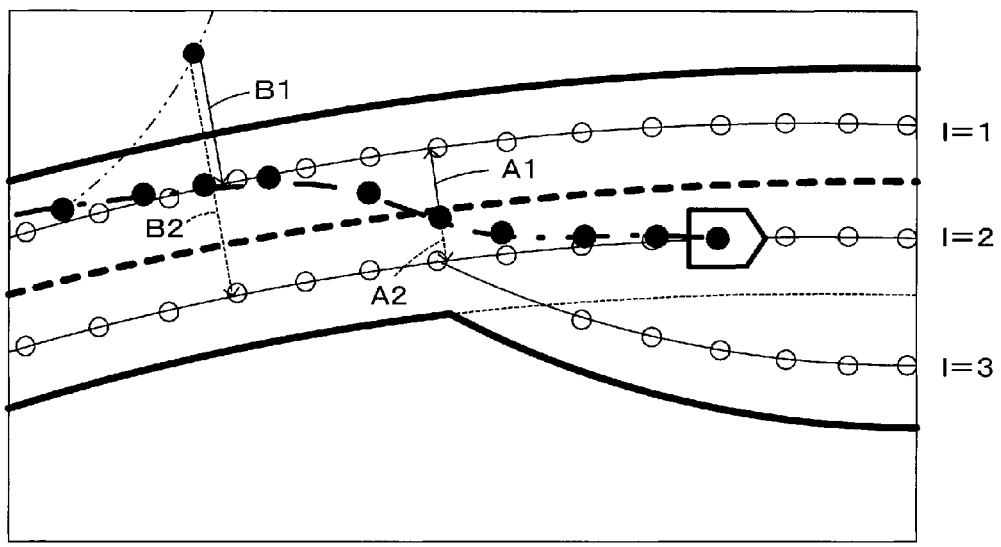

If lengths of perpendiculars dropped from a certain vehicle location included in the corrected trajectory Pa[t] to the respective lanes I1, I2 around the own vehicle are greater than a predetermined length, for example, the perpendiculars B1, B2 shown in FIG. 8, such a vehicle location is removed from the corrected trajectory Pa[t].

This is because, if lengths of perpendiculars dropped from a certain vehicle location included in the corrected trajectory Pa[t] to the respective lanes I1, I2 around the own vehicle are greater than a predetermined length, the own vehicle may be deemed to have left the road and entered a surrounding facility, such as a gas station.

That is, if lengths of perpendiculars dropped from a certain vehicle location to the respective lanes I1, I2 around the own vehicle are all greater than a predetermined length, inclusion of such a vehicle location in the locational trajectory may lead to a poor locational correction accuracy. Therefore, in the present embodiment, only the vehicle locations associated with lengths of perpendiculars less than the predetermined length are allowed to be included in the corrected trajectory Pa[t], and the other vehicle locations are removed from the corrected trajectory Pa[t].

In this way, in step S360, at least one of the lanes I of the road that the vehicle locations included in the corrected trajectory Pa[t] belong to is determined. Thereafter, the process flow proceeds to step S370. In step S370, the location correcting unit 40 calculates an average distance L between the at least one of the lanes I of the road and the corrected trajectory Pa[t].

Figure 9:
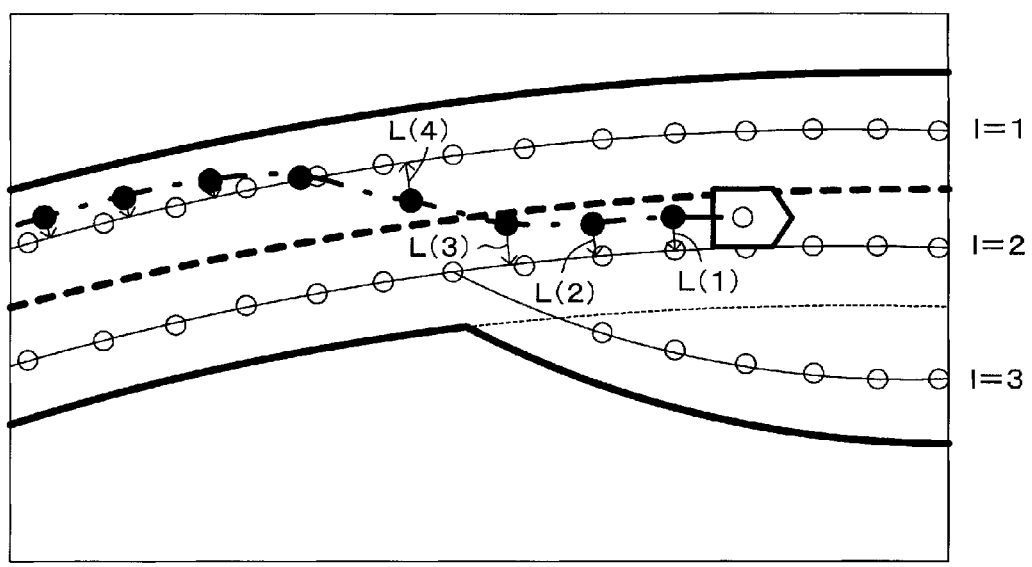
FIG. 9 is an explanatory diagram for describing calculation of an average distance between a corrected trajectory and a map point sequence.

To calculate such an average distance L, the location correcting unit 40, as shown in FIG. 9 (where the own vehicle has made a lane change), drops a perpendicular from each of the vehicle locations included in the corrected trajectory Pa[t] onto the lane determined for the vehicle location to belong to, and calculates lengths of the respective perpendiculars L(1), L(2), . . . to calculate an average over the calculated lengths.

The average distance L calculated in this way indicates a degree of geometrical matching between the corrected trajectory Pa[t] and the at least one of the lanes I determined as above. Therefore, in subsequent step S380, the location correcting unit 40 determines whether or not the average distance L is less than a minimum value Lmin.

If in step S380 it is determined that the average distance L is less than the minimum value Lmin, the location correcting unit 40 determines that the corrected trajectory Pa[t] has a highest degree of geometrical matching between the corrected trajectory Pa[t] and the at least one of the lanes I determined as above. Thereafter, the process flow proceeds to step S390. In step S390, the minimum value Lmin is set to the last calculated average distance L calculated in step S370, and imin that specifies the locational correction amount associated with the shortest average distance L is set to the current counter i. Thereafter, the process flow proceeds to step S400.

If in step S380 it is determined that the average distance L is equal to or greater than the minimum value Lmin, the process flow proceeds to step S400. In step S400, the location correcting unit 40 determines whether or not the counter i is greater than kmax, that is, the number of locational correction amount candidates Pc[k] set in step S330, thereby determining whether or not steps S350-S390 have been performed for all of the locational correction amount candidates Pc[k] set in step S330.

If in step S400 it is determined that the counter i is equal to or less than kmax, then in step S410 the location correcting unit 40 increments the counter i by one. Thereafter, the process flow proceeds to step S350. If in step S400 it is determined that the counter i is greater than kmax, then the process flow proceeds to step S420.

In step S420, the location correcting unit 40 sets the locational correction amount that leads to the minimum value Lmin of the average distance L to the locational correction amount candidate Pc[imin] and stores the locational correction amount candidate Pc[imin] in the memory. Once the locational correction amount has been calculated in step S130, the location correcting unit 40 proceeds to step S140 as shown in FIG. 3. In step S140, the location correcting unit 40 corrects the current location information P[tc] by adding the locational correction amount to the current location information P[tc].

The corrected location information P[tc] is stored in the memory and fed to various driving assistance devices, such as a navigation device mounted in the own vehicle. As described above, in the vehicle location correction apparatus 2 of the present embodiment, the locational trajectory generating unit 30 samples the vehicle location measured by the satellite positioning unit 10 every predetermined time interval and thereby generates the trajectory point sequence P[t] that is the locational trajectory of the own vehicle.

Subsequently, the trajectory point sequence with a limited path length reaching back from the current location of the own vehicle being equal to or less than the maximum path length Amax is extracted from the trajectory point sequence P[t] as the limited trajectory point sequence Pl[t] for use in the locational correction amount calculation.

The location correcting unit 40 randomly translates the limited trajectory point sequence Pl[t] by a plurality of locational correction amount candidates Pc[i] in the coordinate system of the map information to generate a plurality of corrected trajectories Pa[t].

For each of the corrected trajectories Pa[t], the location correcting unit 40 determines, for each of the vehicle locations included in the corrected trajectory Pa[t], which one of the lanes of the road the vehicle location belongs to, calculates, for each of the vehicle locations included in the corrected trajectory Pa[t], a distance between the vehicle location and the lane determined for the vehicle location to belong to, and calculates an average (average distance L) over the distances calculated for the respective vehicle locations included in the corrected trajectory Pa[t]. The location correcting unit 40 further determines one of the corrected trajectories Pa[t] associated with the shortest average distance L.

The location correcting unit 40 sets the locational correction amount candidate Pc[k] used to generate the determined corrected trajectory Pa[t] associated with the shortest average distance L as the locational correction amount of the current vehicle location, where the determined corrected trajectory Pa[t] is the locational trajectory that best matches the traveled lane.

With the vehicle location correction apparatus 2 of the present embodiment, the lane that the own vehicle is traveling in is determined, and the vehicle location can be corrected onto the determined lane. This can enhance the accuracy of correcting the vehicle location, as compared to the known apparatus.

The location correcting unit 40, when determining which of the lanes of the road that the vehicle locations included in the corrected trajectory Pa[t] belong to, drops perpendiculars from a respective vehicle location included in the corrected trajectory Pa[t] onto lanes around the own vehicle specified by the map point sequences M[l][m], and select one of these lanes associated with the shortest perpendicular.

To acquire a degree of geometrical matching between a respective corrected trajectory Pa[t] and the at least one of the lanes of the road determined for the vehicle locations included in the corrected trajectory Pa[t] to belong to, the location correcting unit 40 drops a perpendicular from a respective vehicle location included in the corrected trajectory Pa[t] onto the lane determined for the vehicle location to belong to, and calculates lengths of the respective perpendiculars for the respective vehicle locations included in the corrected trajectory Pa[t] to calculate an average over the calculated lengths of the respective perpendiculars.

Therefore, even if the own vehicle has made a lane change, a degree of matching between the traveled lane and the travel trajectory can be properly determined.

Second Embodiment

Figure 10:
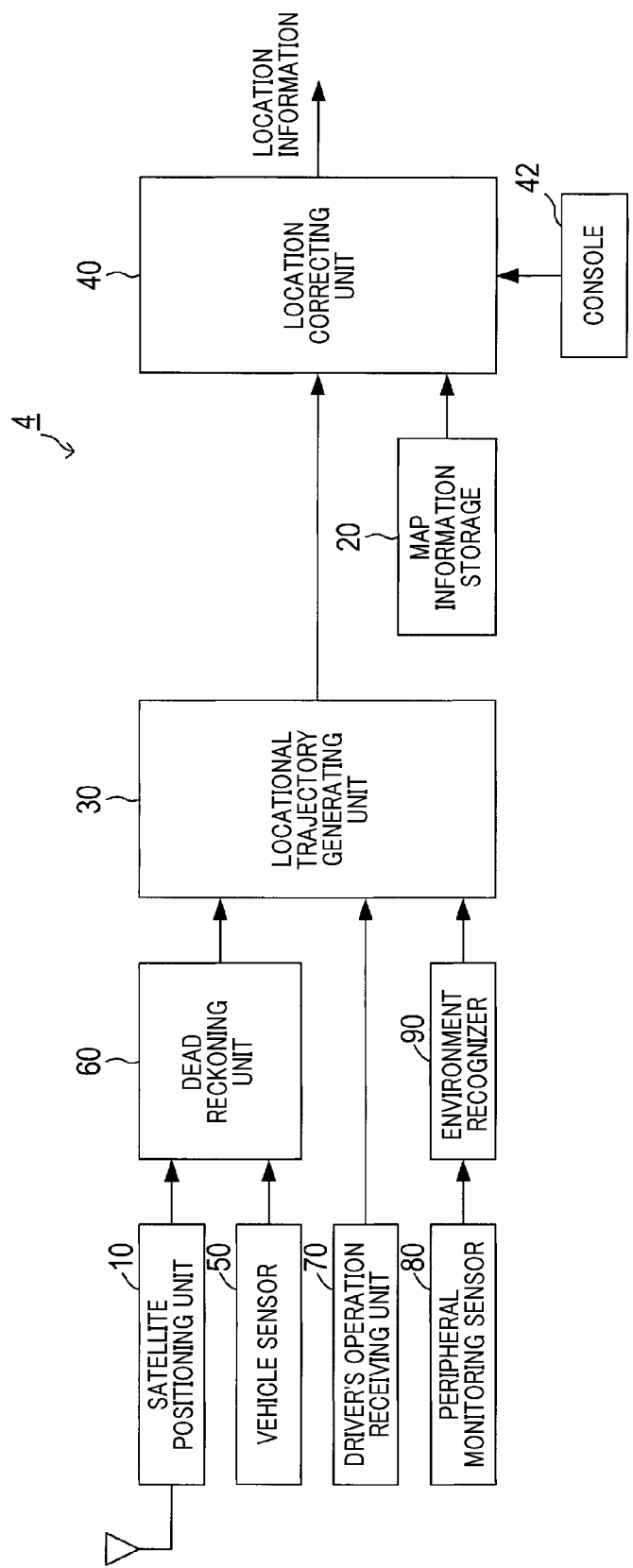
FIG. 10 is a block diagram of the overall configuration of a vehicle location correction apparatus in accordance with a second embodiment of the present invention.

As shown in FIG. 10, the vehicle location correction apparatus 4 in accordance with a second embodiment of the present invention includes a satellite positioning unit 10, a map information storage 20, a locational trajectory generating unit 30, a location correcting unit 40, a vehicle sensor 50, a dead reckoning unit 60, a driver's operation receiving unit 70, a peripheral monitoring sensor 80, and an environment recognizer 90. The satellite positioning unit 10, the map information storage 20, the locational trajectory generating unit 30, and the location correcting unit 40 are similar elements to those of the vehicle location correction apparatus 2 of the first embodiment.

The vehicle sensor 50, as a state detector, is configured to detect a travel state of the own vehicle. The vehicle sensor 50 includes a wheel speed sensor and a gyro sensor to detect state quantities, such as a vehicle speed and an acceleration. The dead reckoning unit 60 is configured to, every predetermined time interval, calculate an amount of relative movement from a previous time using the state quantities acquired from the vehicle sensor 50, and estimate a location of the own vehicle based on the calculated amount of relative movement and the location information acquired from the satellite positioning unit 10.

The dead reckoning unit 60 is configured to adjust a combination of the satellite positioning for use in the locational estimation and the amount of relative movement (weighting factor) in response to the state of satellite positioning of the satellite positioning unit 10 (e.g., the number of visible satellites at the GPS receiver).

Therefore, as compared to the first embodiment where only the satellite positioning unit 10 is used to measure the location of the own vehicle, this configuration can provide more accurate measurements of the location of the own vehicle. The location information acquired from the dead reckoning unit 60 is fed to the locational trajectory generating unit 30.

The driver's operation receiving unit 70 is configured to receive driver's driving operations, such as operations of the steering and the direction indicator and the like. The peripheral monitoring sensor 80 is formed of camera, lidar, millimeter-wave radar and is used to acquire environmental information, such as images of surroundings of the own vehicle and range points.

The environment recognizer 90 is configured to recognize positions of white lines around the own vehicle using surroundings information, such as images and range points, acquired from the peripheral monitoring sensor 80, and using the recognized positions of white lines, calculate a relative position of the own vehicle within the traveled lane, that is, the lane that the own vehicle is traveling in.

Figure 12:
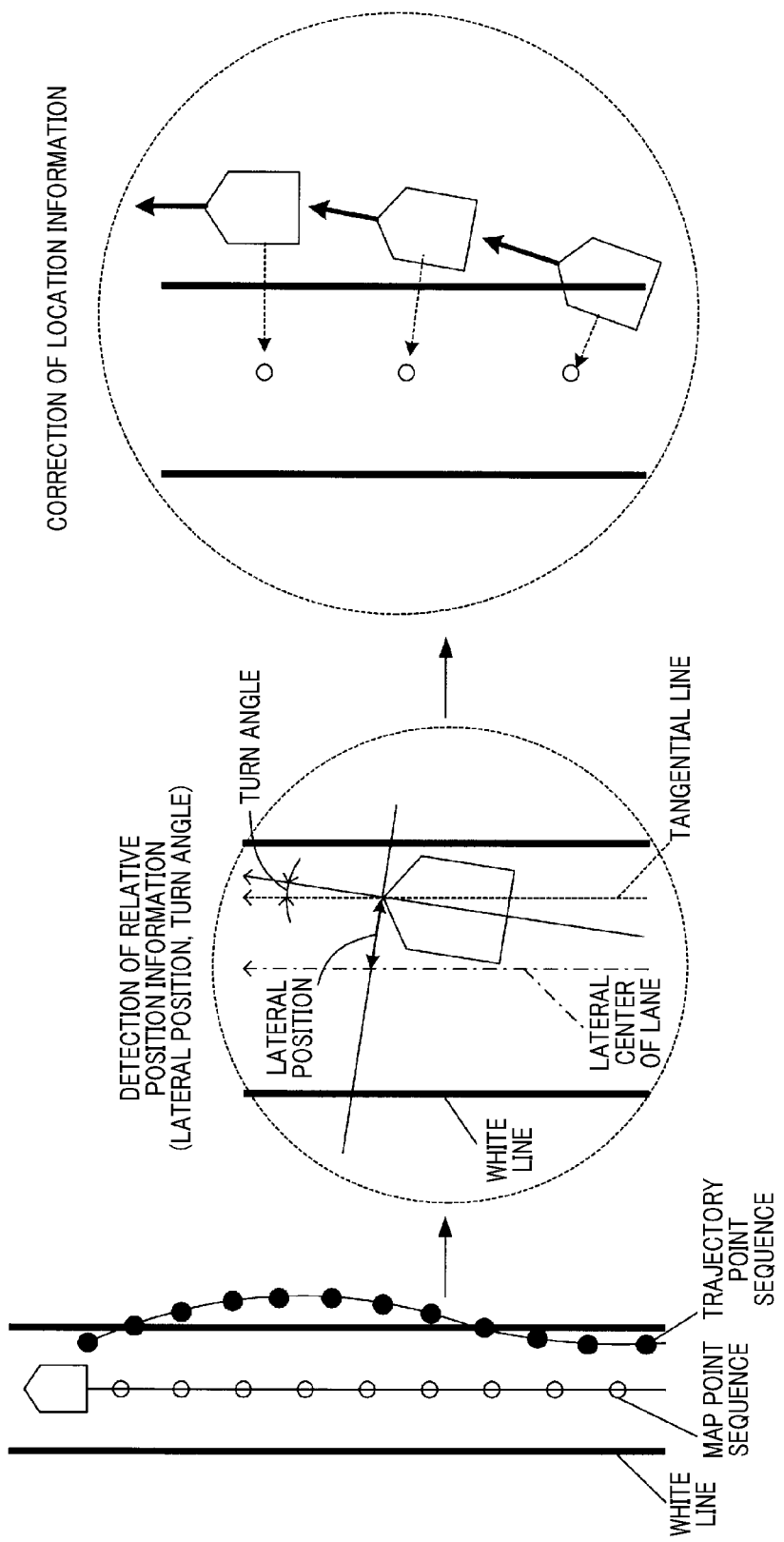
FIG. 12 is an explanatory diagram for describing vehicle location correction in the processing shown in FIG. 11.

As shown in FIG. 12, the relative position of the own vehicle within the traveled lane is specified by a lateral position of the center of mass of the own vehicle relative to the center line of the traveled lane and a turn angle of the own vehicle with respect to a tangent of the center line of the traveled lane. In FIG. 12, the traveled lane is a straight lane. Therefore, the turn angle of the own vehicle is an inclination angle of a travel direction of the own vehicle with respect to the straight line. In the case of a curved lane, the turn angle of the own vehicle is an inclination angle of the travel direction with respect to a tangent of the center line of the curved lane.

The position of the own vehicle relative to the traveled lane acquired in the environment recognizer 90 is fed to the locational trajectory generating unit 30. Based on the position of the own vehicle relative to the traveled lane (i.e., a relative position of the own vehicle), the locational trajectory generating unit 30 corrects the current location of the own vehicle P[tc] acquired from the dead reckoning unit 60.

Figure 11:
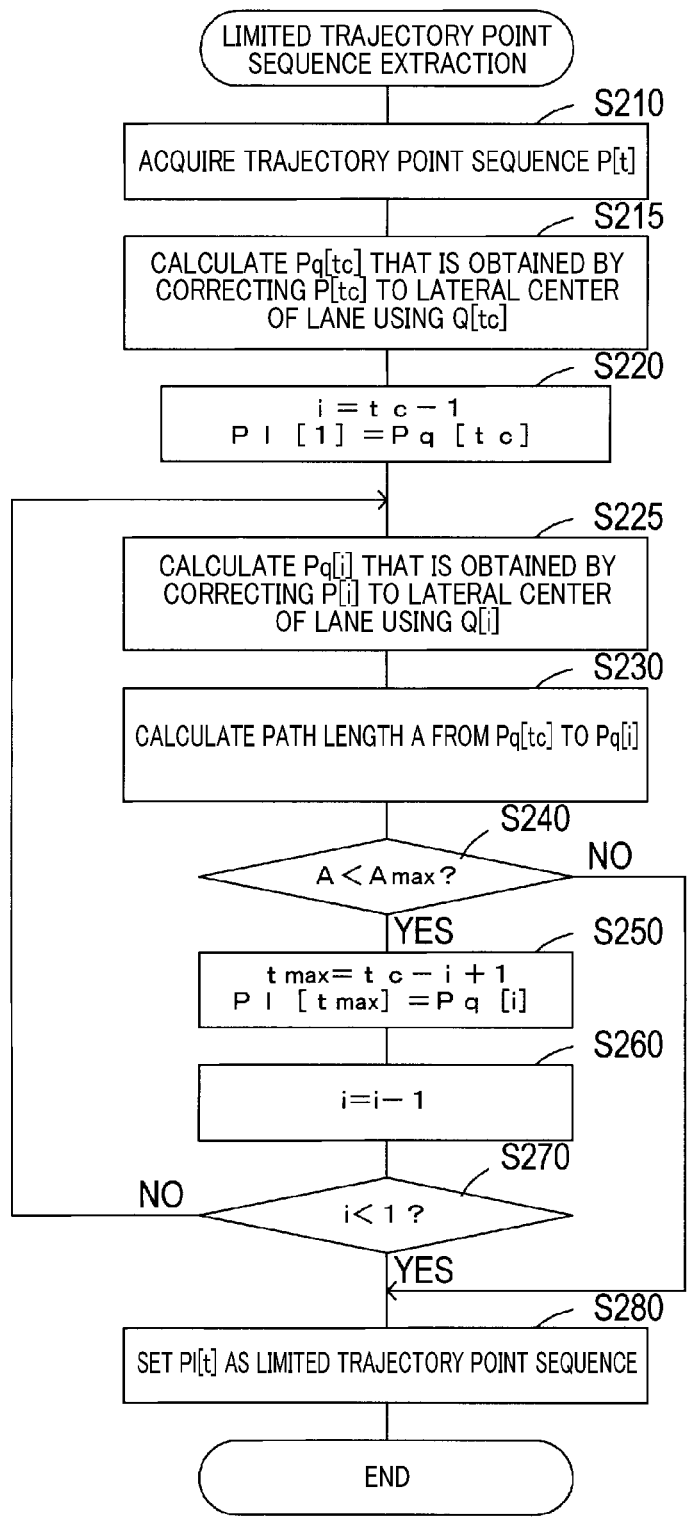
FIG. 11 is a flowchart of limited trajectory point sequence extraction processing of the second embodiment.

That is, in the limited trajectory point sequence extraction processing as shown in FIG. 11, the locational trajectory generating unit 30 acquires the trajectory point sequence P[t] in step S210. The process flow proceeds to step S215, where the locational trajectory generating unit 30 acquires the current relative position information Q[tc] from the environment recognizer 90.

In step S215, the locational trajectory generating unit 30 uses the acquired relative position information Q[tc] to correct the current location information P[tc] included in the trajectory point sequence P[t] to the lateral center of the traveled lane. In step S220, an initial search position Pl[1] of the limited trajectory point sequence Pl[t] is set to the corrected location information Pq[tc] acquired in step S215. Thereafter, the process flow proceeds to step S225.

In step S225, the locational trajectory generating unit 30 acquires relative position information Q[i] at time i from the environment recognizer 90, and using the relative position information Q[i], corrects the location information P[i] at time i included in the trajectory point sequence P[t] to the lateral center of the traveled lane.

In step S230, the locational trajectory generating unit 30 calculates a path length A of a trajectory from the current location specified by the corrected location information Pq[tc] to a location specified by corrected location information Pq[i]. The locational trajectory generating unit 30 generates the limited trajectory point sequence Pl[t] following a procedure similar to that described in the first embodiment, As shown in FIG. 12, with this configuration, if the own vehicle is traveling inside the white lines of a lane, the location of the own vehicle can be corrected to the lateral center of the lane using the relative position information acquired from the environment recognizer 90 even if the location of the own vehicle acquired from the dead reckoning unit 60 has moved out of the lane across one of the white lines.

Therefore, the present embodiment configured as above can reduce errors in the vehicle locations included in the limited trajectory point sequence for use in the locational correction, thus leading to improved accuracy of detecting the vehicle location, as compared to the first embodiment. The location correcting unit 40 uses the limited trajectory point sequence generated in the locational trajectory generating unit 30 to calculate the locational correction amounts. However, if the own vehicle is traveling straight, the limited trajectory point sequence becomes linear, which leads to a poor locational correction accuracy.

That is, the location correcting unit 40 randomly translates the limited trajectory point sequence to extract the limited trajectory point sequence with a highest degree of geometrical matching with the traveled lane, and calculates a translation amount of the extracted limited trajectory point sequence as a locational correction amount. Thus, if there are fewer inflection points in the limited trajectory point sequence, it is difficult to extract the limited trajectory point sequence with a highest degree of geometrical matching with the traveled lane, which may lead to a poor accuracy of setting the locational correction amount.

Figure 13:
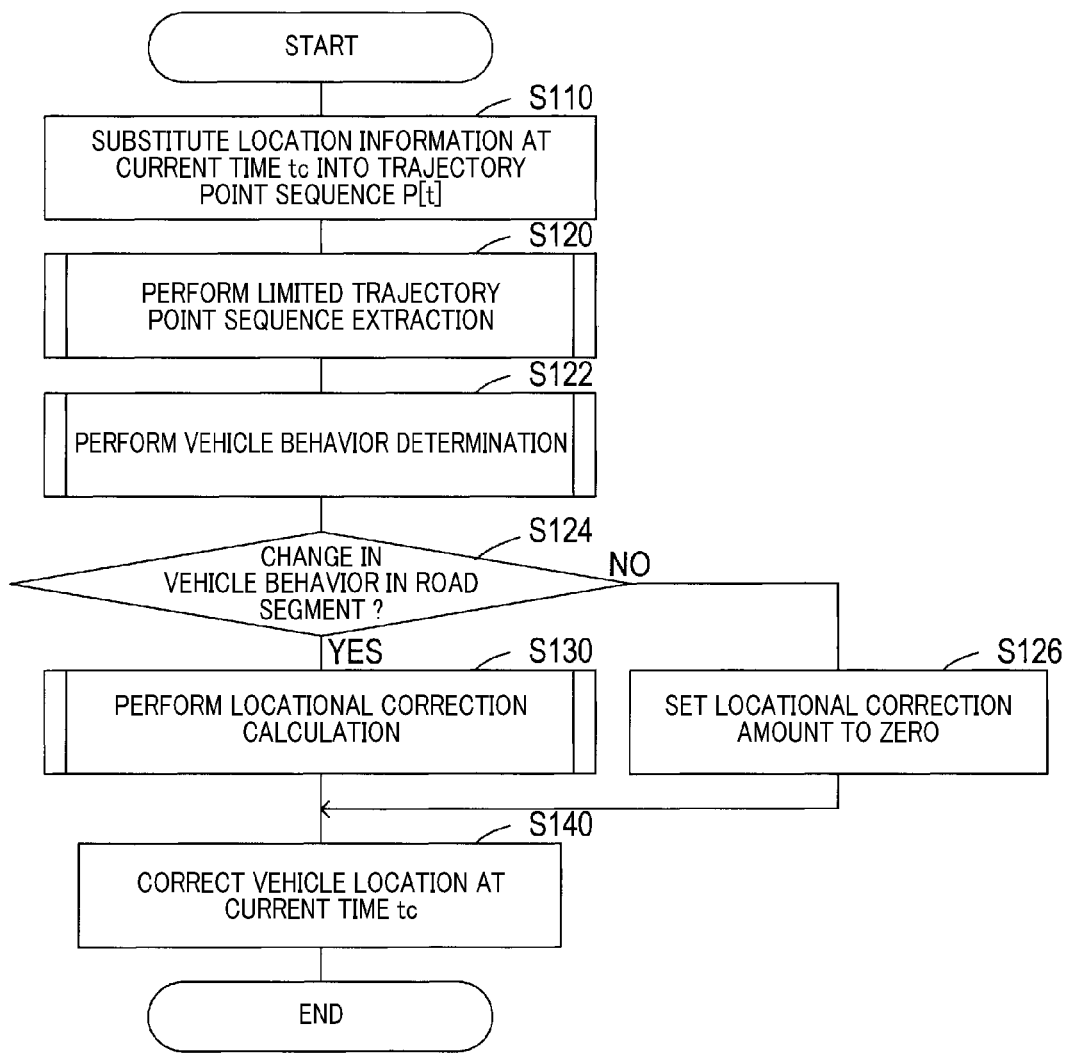
FIG. 13 is a flowchart of processing to be performed in the location correcting unit of the second embodiment.
Figure 14:
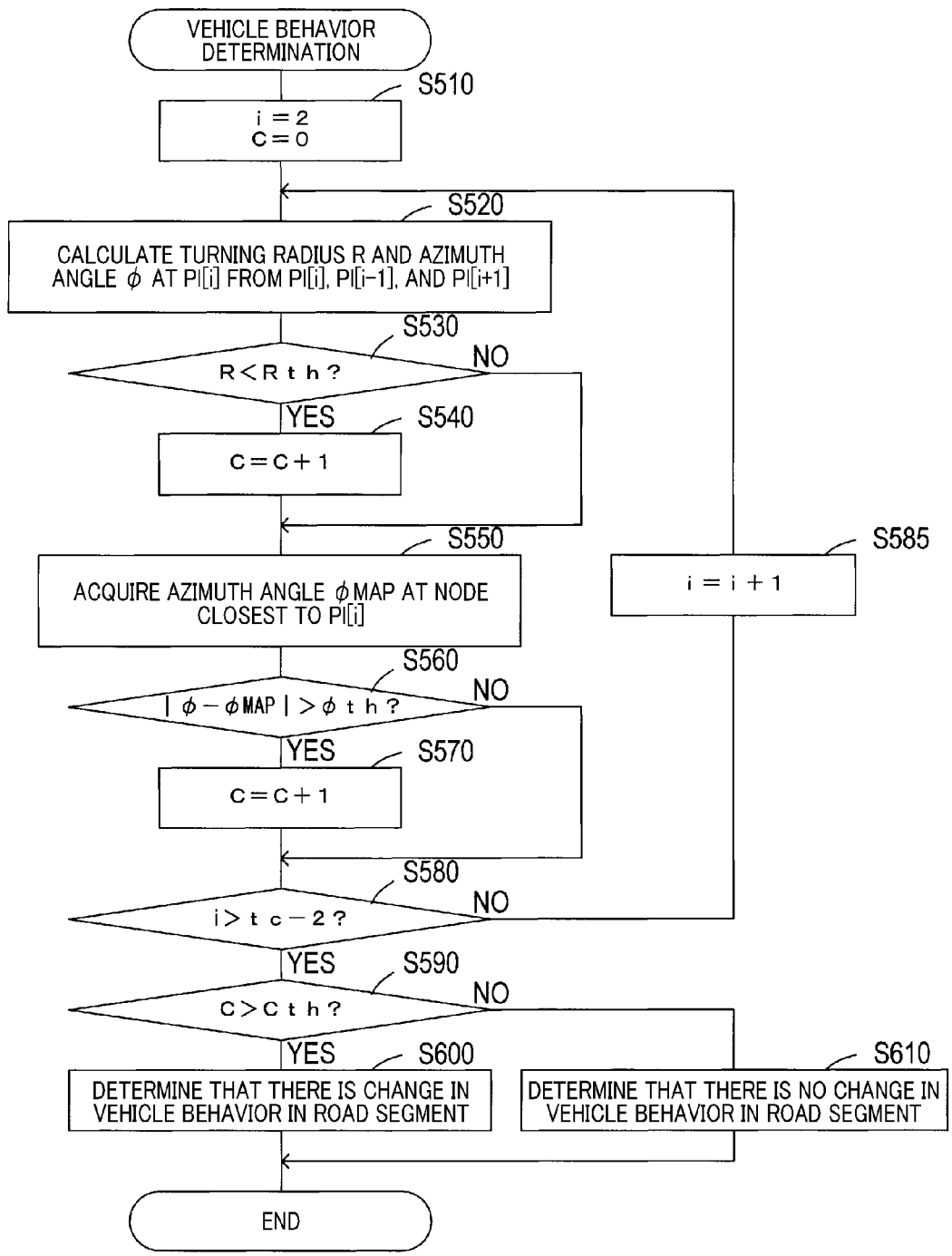
FIG. 14 is a flowchart of vehicle behavior determination processing shown in FIG. 13.

As shown in FIG. 13, the location correcting unit 40 performs vehicle behavior determination processing in step S122 before performing the locational correction amount calculation processing, thereby determining the presence or absence of a change in vehicle behavior in a road segment corresponding to the limited trajectory point sequence.

If in step S124 the location correcting unit 40 has determined based on the determination result that there is a change in vehicle behavior in the road segment corresponding to the limited trajectory point sequence, then the process flow proceeds to step S130. In step S130, the location correcting unit 40 performs the locational correction amount calculation processing. Thereafter, the process flow proceeds to step S140.

If in step S124 the location correcting unit 40 has determined that there is no change in vehicle behavior in the road segment corresponding to the limited trajectory point sequence, then the process flow proceeds to step S126. In step S126, the location correcting unit 40 sets the locational correction amount at current time tc to zero. Thereafter, the process flow proceeds to step S140.

This configuration can provide more improved accuracy of correcting the vehicle location, as compared to the present embodiment. The vehicle behavior determination processing is performed in step S122 as follows.

Figure 15:
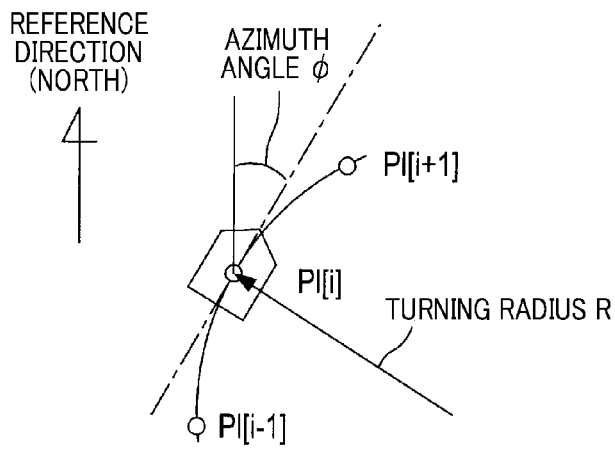
FIG. 15 is an explanatory diagram for describing an azimuth angle and a turning radius calculated in the vehicle behavior determination processing of FIG. 14.

In the vehicle behavior determination processing, in step S510, the location correcting unit 40 initially sets the counter i to a value of 2 and initially sets a counter C to a value of 0. In step S520, using the i-th location information PIN and its previous and subsequent location information Pl[i−1], Pl[i+1] in the limited trajectory point sequence, the location correcting unit 40 estimates a turning radius R and an azimuth angle φ of the own vehicle based on a positional relationship between these vehicle locations, as shown in FIG. 15.

The turning radius R is a parameter indicative of a turning state of the own vehicle and decreases with increasing curvature of a travel path acquired from the limited trajectory point sequence. Therefore, in the present embodiment, the turning radius R is estimated as a curvature of the travel path.

The azimuth angle φ is a clockwise angle with respect to a reference direction, such as the North direction, and corresponds to a trajectory angle. Comparing the azimuth angle φ with a direction of the lane (or a lane angle), it can be determined whether or not the travel direction of the own vehicle differs from the direction of the traveled lane. Based on an angle difference between the travel direction of the own vehicle and the direction of the lane can make it possible to determine whether or not there is a lane change of the own vehicle.

In step S530, the location correcting unit 40 determines whether or not the turning radius R that is an estimation of turning state of the own vehicle is less than a predetermined threshold Rth. That is, the location correcting unit 40 determines whether the curvature of the travel path of the own vehicle is greater than a predetermined threshold.

If in step S530 it is determined that the turning radius R is less than the threshold Rth, then it is determined that the own vehicle has turned right, turned left, or turned around. Thereafter, the process flow proceeds to step S540, where the counter C is incremented by one, and then the process flow proceeds to step S550. If in step S530 it is determined the turning radius R is equal to or greater than the threshold Rth, then the process flow proceeds directly to step S550.

In step S550, the location correcting unit 40 searches for a node included in the map information closest to the vehicle location specified by the location information PIM, and based on directions of links connected to the node, acquires an azimuth angle φMAP of the traveled lane at the node as the lane angle.

In step S560, the location correcting unit 40 determines whether or not an absolute value of a difference between the azimuth angle φ acquired in step S520 indicative of the travel direction of the own vehicle and the azimuth angle φMAP of the lane acquired in step S550 is greater than a predetermined threshold φth.

If in step S560 it is determined that the absolute value of the difference between the azimuth angle φ and the azimuth angle φMAP is greater than the predetermined threshold φth, then the location correcting unit 40 determines that the own vehicle has made a lane change, and then the process flow proceeds to step S570. In step S570, the counter C is incremented by one, and then the process flow proceeds to step S580. If in step S560 it is determined that the absolute value of the difference between the azimuth angle φ and the azimuth angle φMAP is equal to or less than the predetermined threshold φth, then the process flow proceeds directly to step S580.

In step S580, the location correcting unit 40 determines whether or not the counter i is greater than tc−2. This step is performed to determine whether or not the sequence of steps S520-S570 has been performed over the travel path corresponding to the limited trajectory point sequence. If in step S580 it is determined that the counter i is greater than tc−2, then the process flow proceeds to step S590.

If in step S580 it is determined that the counter i is equal to or less than tc−2, then the process flow proceeds to step S585. In step S585, the counter i is incremented by one, and then the process flow proceeds to step S520. In step S590, the location correcting unit 40 determines whether or not the counter C is greater than threshold Cth. As described above, the counter C is incremented by one in step S540 or S570 every time it is determined that the own vehicle has performed the left turn, right turn, U-turn, or lane change. That is, the counter C counts the number of times the own vehicle has performed any one of the specific vehicle driving actions.

If in step S590 it is determined that the counter C is greater than the threshold Cth, then in step S600 it is determined that there is a change in vehicle behavior in a road segment specified by the limited trajectory point sequence. Thereafter, the process flow of the vehicle behavior determination processing ends.

If in step S590 it is determined that the counter C is equal to or less than the threshold Cth, then in step S610 it is determined that there is no change in vehicle behavior in the road segment specified by the limited trajectory point sequence. Thereafter, the process flow of the vehicle behavior determination processing ends.

In the present embodiment, as described above, the turning radius R and the azimuth angle φ are acquired to determine whether or not there is a change in vehicle behavior that allows for accurate calculation of the locational correction amount (i.e., specific vehicle driving action) in the travel path corresponding to the limited trajectory point sequence.

Instead of the turning radius R and the azimuth angle φ, the curvature of the travel path of the own vehicle may be acquired. Based on a magnitude of the curvature of the travel path or a difference between the curvature of the lane and the curvature of the travel path, it may be determined whether or not the own vehicle has turned left, turned right, turned around, or made a lane change.

In an alternative embodiment, the specific vehicle driving actions may be detected based on operations of the steering, the direction indicator or others detected in the driver's operation receiving unit 70.

In such an embodiment, upon detection of the specific driving action, the detection result may be stored in the memory in association with the detection time or the vehicle location at the detection time. This configuration makes it possible to determine how many times any one of such specific vehicle driving actions has been performed, which can yield similar advantages to those described above.

Modifications

The present invention is not limited to the above-described embodiments. Modifications can be made as appropriate within the scope recited in the scope of claims.

First Modification

In the limited trajectory point sequence extraction processing in accordance with each of the above embodiments, as shown in FIGS. 2 and 13, the locational trajectory generating unit 30, in step S110, substitutes the current location information into the trajectory point sequence P[t] to update the trajectory point sequence P[t]. Thereafter, the process flow proceeds to step S120.

If the number of points included in the trajectory point sequence P[t] (i.e., the number of vehicle locations) is too low, the travel path of the own vehicle may not be determined, which may result in a small number of points included in the limited trajectory point sequence that can be used to generate the locational correction amount.

Figure 16:
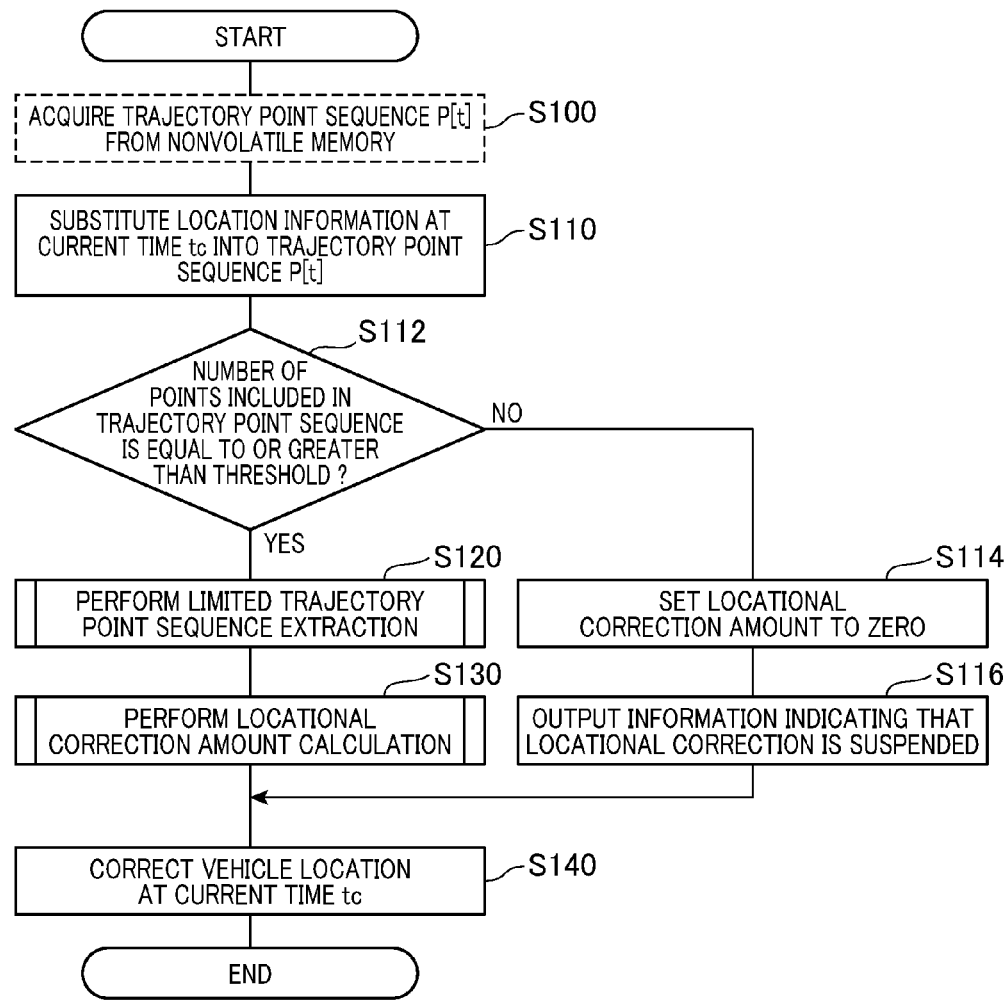
FIG. 16 is a flowchart of processing to be performed in the locational trajectory generating unit in accordance with a first modification.

In the first modification, as shown in FIG. 16, upon updating the trajectory point sequence P[t] in step S110, the locational trajectory generating unit 30, in step S112, determines whether or not the number of points included in the updated trajectory point sequence P[t] is equal to or greater than a threshold that is a lower limit required to calculate the locational correction amount.

If the number of points included in the updated trajectory point sequence P[t] is equal to or greater than the threshold, then the process flow proceeds to step S120, where the location correcting unit 40 performs the limited trajectory point sequence extraction processing. If the number of points included in the updated trajectory point sequence P[t] is less than the threshold, then the process flow proceeds to step S114, where the location correcting unit 40 sets the locational correction amount to zero.

Once the location correcting unit 40 has set the locational correction amount to zero in step S114, then in step 116 the location correcting unit 40 outputs information indicating that the locational correction is suspended, to external devices, such as various driving assistance apparatuses. Thereafter, the process flow proceeds to step S140.

Thus, the external devices adapted to acquire the vehicle location from the location correcting unit 40 can know that, since the vehicle location is currently uncorrected, the locational correction accuracy is low. In such a case, for example, inhibiting some of the driving assistance functions can prevent erroneous control that may be caused by errors in vehicle locations.

In the flowchart shown in FIG. 16, the locational trajectory generating unit 30 performs step S100 before updating the trajectory point sequence P[t] using the current location information in step S110.

In step S100, upon activation of the vehicle location correction apparatus, the locational trajectory generating unit 30 acquires the trajectory point sequence P[t] stored in a nonvolatile memory, such as a flash ROM, before the vehicle location correction apparatus is last deactivated.

The locational trajectory generating unit 30 performing step S100 can prevent the trajectory point sequence P[t] stored in the RAM from being eliminated upon deactivation of the vehicle location correction apparatus caused by stop of the engine of the own vehicle and having to be generated from scratch upon reactivation of the vehicle location correction apparatus.

Second Modification

In the above embodiments, the map information including locations (latitude, longitude and altitude) of the nodes in the lateral center of each lane and a shape (curvature and gradient) of the link connecting these nodes is stored in the storage media of the map information storage 20. Such map information is hereinafter referred to as lane information.

If road information representing a location and a shape (e.g., curvature, gradient, the number of lanes, and width) of each road is stored in the storage media of the map information storage 20 and if no lane information is stored in the storage media of the map information storage 20, the lane information may be generated from the road information.

Figure 17:
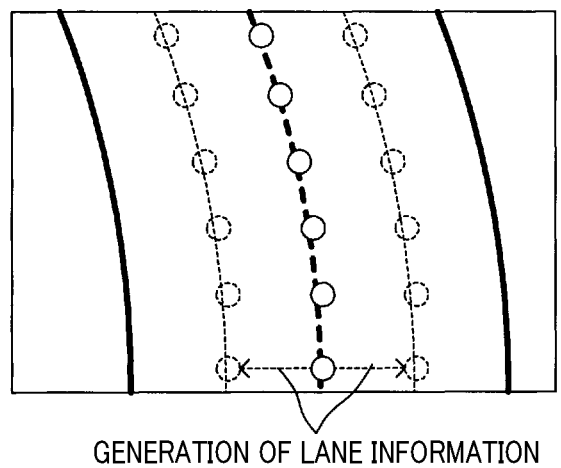
FIG. 17 is an explanatory diagram for describing a map information configuration and lane information generation in accordance with a second modification.

That is, as shown in FIG. 17, based on the location information of each road, the number of lanes of the road, and the road width, the lane information may be generated by calculating a location, on the map, of each lane of the road (e.g., locations of nodes in the lateral center of the lane).

With this configuration, as in the above embodiments, using the generated lane information, a degree of geometrical matching between the travel path of the own vehicle acquired from the limited trajectory point sequence and each lane of the road can be calculated as an average distance L, and based on the average distances, the locational correction amount can be estimated.

If boundary information representing locations of left and right boundaries (e.g., white lines) of a respective lane is stored in the storage media of the map information storage 20, the lane information may be generated from the boundary information.

Third Modification

In each of the first and second embodiments and the second modification, a location and a shape of each lane is acquired using the lane information stored in the storage media of the map information storage 20 or the lane information generated from the map information stored in the storage media of the map information storage 20, and a degree of geometrical matching between the lane and the travel path of the own vehicle is calculated.

However, there may be a lane acquired from the map information, in which lane the own vehicle is unable to travel due to weather conditions, such as deposited snow or fallen rocks, or roadworks.

Figure 18:
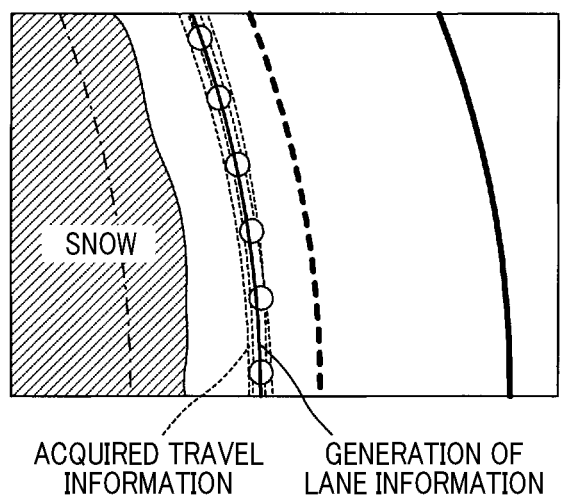
FIG. 18 is an explanatory diagram for describing lane information generation in accordance with a third modification.

In such a case, as shown in FIG. 18, travel information may be acquired from the other vehicles via a wireless communication device mounted in the own vehicle, and based on the acquired travel information, it may be recognized where the own vehicle is traveling within a lane acquired from the map information.

Based on the travel information acquired from the other vehicles, travel trajectories of the other vehicles may be averaged, and based on the averaged travel trajectory, the lane information acquired from the map information may be modified so that the map information is adapted for actual travel conditions.

With this configuration, even if there is a lane in the map information stored in the storage media of the map information storage 20, in which lane the own vehicle may not travel as usual, the lane information may be properly modified, thereby providing more improved accuracy of calculating the locational correction amount.

To modify the lane information in this way, the travel information does not have to be necessarily acquired from the other vehicles. For example, traffic information, such as running constraints, wirelessly transmitted from a broadcast station may be acquired, and based on such information, the lane information may be modified.

Fourth Modification

In each of the first and second embodiments, the map information described in the three-dimensional coordinate system (latitude, longitude, altitude) is stored in the storage media of the map information storage 20. Alternatively, the map information may be described in a two-dimensional coordinate system (latitude, longitude).

Also in such a modification that the trajectory point sequence P[t] is generated as the vehicle locational trajectory in the two-dimensional coordinate system, the locational correction amount may be calculated to correct the vehicle location.

Fifth Modification

In each of the first and second embodiments, the location correcting unit 40 is provided with the console 42. A vehicle user can set various operating conditions of the location correcting unit 40, such as the maximum path length Amax of the limited trajectory point sequence, via the console 42.

Alternatively, operating conditions of the location correcting unit 40 may be set via external devices. In such a modification, the operating conditions of the location correcting unit 40, such as the maximum path length AMAX, may be set at the external devices utilizing the location information, depending on the accuracy of the location information that may vary with a vehicle speed or a detection speed, which makes it possible to properly acquire necessary location information.

What is claimed is:

1. An apparatus for correcting a location of a vehicle on a road the vehicle is traveling thereon, comprising:
   a satellite positioning unit mounted in the vehicle and configured to measure the location of the vehicle on the road using navigation satellites and output location information of the vehicle;
   a map information storage storing map information from which lanes of the road can be recognized;
   a locational trajectory generating unit configured to generate a locational trajectory of the vehicle based on the location information of the vehicle output by the satellite positioning unit;
   a location correcting unit configured to correct the location information of the vehicle based on the locational trajectory generated in the locational trajectory generating unit and the map information stored in the map information storage, the location correcting unit being configured to, for each vehicle location included in the locational trajectory, determine at least one traveled lane of the road within which the vehicle is traveling, and geometrically compare the at least one traveled lane of the road the locational trajectory, and based on the comparison, calculate a locational correction amount of the location of the vehicle; and
   a driving assistance unit configured to correct, via a specific driving action, the location of the vehicle on the road based on the locational correction amount.

2. The apparatus according to claim 1, wherein the location correcting unit is configured to drop perpendiculars from vehicle locations included in the locational trajectory onto each of the lanes of the road acquired from the map information, and for each of the vehicle locations included in the locational trajectory, determine a lane associated with a shortest perpendicular as a traveled lane that is a lane traveled by the vehicle as the vehicle location is measured.

3. The apparatus according to claim 1, wherein the location correcting unit is configured to drop perpendiculars from vehicle locations included in the locational trajectory onto each of the lanes of the road acquired from the map information, and for each of the vehicle locations included in the locational trajectory, determine a lane associated with a shortest perpendicular having a length equal to or less than a predetermined length as a traveled lane that is a lane traveled by the vehicle as the vehicle location is measured.

4. The apparatus according to claim 1, wherein the location correcting unit is configured to calculate the locational correction amount based on a degree of geometrical matching between the at least one traveled lane and the locational trajectory.

5. The apparatus according to claim 1, wherein the location correcting unit is configured to calculate a translation amount by which the locational trajectory is translated in a coordinate system of the map information so that the locational trajectory best matches the at least one traveled lane, as the locational correction amount.

6. The apparatus according to claim 5, wherein the location correcting unit is configured to, for each of a plurality of translated locational trajectories obtained by differently translating the locational trajectory in the coordinate system of the map information, determine which of the lanes of the road acquired from the map information vehicle locations included in the translated locational trajectory belong to, drop perpendiculars from vehicle locations included in the translated locational trajectory onto at least one of the lanes of the road acquired from the determination, calculate an average of lengths of the perpendiculars over the translated locational trajectory, and determine that the translated locational trajectory associated with a smallest average, among the plurality of translated locational trajectories, best matches the at least one traveled lane.

7. The apparatus according to claim 1, wherein the location correcting unit is configured to, based on vehicle locations included in the locational trajectory, determine whether or not the specific driving action has been performed based on whether or not there is a significant change in vehicle behavior from straight travel of the vehicle, and utilize the determination result for estimating the locational correction amount.

8. The apparatus according to claim 7, wherein the specific driving action is selected from at least one of a lane change, a left turn, a right turn, and a U-turn.

9. The apparatus according to claim 7, wherein the location correcting unit is configured to, if a total number of times over the locational trajectory it is determined that the specific driving action has been performed is equal to or less than a predetermined threshold, set the locational correction amount to zero.

10. The apparatus according to claim 8, wherein the location correcting unit is configured to, for each of the vehicle locations included in the locational trajectory, estimate a turning state of the vehicle based on a positional relationship between the vehicle location and each proximate vehicle locations, and based on the estimation, determine whether or not the lane change, the left turn, the right turn, or the U-turn, as specific driving action, has been performed.

11. The apparatus according to claim 8, wherein the location correcting unit is configured to, for each of the vehicle locations included in the locational trajectory, calculate a trajectory angle that is an azimuthal angle of the locational trajectory at the vehicle location, and if a difference between the calculated trajectory angle and a lane angle that is an azimuthal angle of the at least one traveled lane at the vehicle location is equal to or greater than a predetermined threshold, determine that the lane change, as the specific driving action, has been performed.

12. The apparatus according to claim 1, wherein the location correcting unit is configured such that a length of the locational trajectory used to calculate the locational correction amount is variably set.

13. The apparatus according to claim 1, further comprising an environment recognizer configured to monitor surroundings of the vehicle and a relative position of the vehicle with respect to the lane that the vehicle is traveling in,
   wherein the locational trajectory generating unit is configured to, based on the relative position of the vehicle recognized in the environment recognizer, modify the locational trajectory.

14. The apparatus according to claim 1, wherein the map information includes at least one of lane information indicative of a location of each lane of the road, boundary information indicative of boundaries of each lane of the road, and road information indicative of a location, a width and a number of lanes of the road.

15. The apparatus according to claim 1, further comprising:

a state detector configured to detect a travel state of the vehicle; and a dead reckoning unit configured to, based on the location of the vehicle measured in the satellite positioning unit and the travel state of the vehicle detected in the state detector, estimate the location of the vehicle, wherein the locational trajectory generating unit is configured to, based the location of the vehicle estimated in the dead reckoning unit, generate the locational trajectory of the vehicle.

16. A method for correcting a location of a vehicle on a road the vehicle is traveling thereon, comprising:

measuring the location of the vehicle on the road using navigation satellites;

storing map information from which lanes of the road can be recognized;

generating a locational trajectory of the vehicle based on the location of the vehicle measured;

determining, for each vehicle location included in the locational trajectory, at least one traveled lane of the road within which the vehicle is traveling;

geometrically comparing the at least one traveled lane of the road and the locational trajectory;

calculating, based on the comparing, a locational correction amount of the location of the vehicle; and correcting, via a specific driving action, the location of the vehicle on the road based on the locational correction amount.

17. A system for correcting a location of a vehicle on a road the vehicle is traveling thereon, comprising:

a satellite positioning unit mounted in the vehicle and configured to measure the location of the vehicle on the road using navigation satellites and output location information of the vehicle;

a map information storage storing map information from which lanes of the road can be recognized;

a computer comprising:

a central processor;

a non-transitory computer-readable storage medium; and a set of computer-executable instructions stored on the computer-readable storage medium that cause the central processor to implement:

a locational trajectory generating unit configured to generate a locational trajectory of the vehicle based on the location information of the vehicle output by the satellite positioning unit; and a location correcting unit configured to correct the location information of the vehicle based on the locational trajectory generated in the locational trajectory generating unit and the map information stored in the map information storage, the location correcting unit being configured to, for each vehicle location included in the locational trajectory, determine at least one traveled lane of the road within which the vehicle is traveling, and geometrically compare the at least one traveled lane of the road and the locational trajectory, and based on the comparison, calculate a locational correction amount of the location of the vehicle; and a driving assistance unit configured to correct, via a specific driving action, the location of the vehicle on the road based on the locational correction amount.

* * * * *